W. T. BELL AND F. J. BRETHERTON.
GLANDS OF STEAM ENGINES.
APPLICATION FILED AUG. 9, 1920.

1,361,669.

Patented Dec. 7, 1920.

Inventors
William T. Bell
Francis J. Bretherton by
Attorney

UNITED STATES PATENT OFFICE.

WILLIAM THOMAS BELL AND FRANCIS JAMES BRETHERTON, OF LINCOLN, ENGLAND.

GLANDS OF STEAM-ENGINES.

1,361,669.  Specification of Letters Patent.  Patented Dec. 7, 1920.

Application filed August 9, 1920. Serial No. 402,412.

*To all whom it may concern:*

Be it known that we, WILLIAM THOMAS BELL and FRANCIS JAMES BRETHERTON, subjects of the King of Great Britain, residing at Lincoln, England, have invented certain new and useful Improvements in Connection with the Glands of Steam-Engines, of which the following is a specification.

It has been proposed in sealing tubes on the outside near their ends to provide the tube retaining plates with grooves around the tubes filling the grooves with packing to have contact with the tubes and providing rings to engage the packings and disks centrally screwed to the plates, each disk to press simultaneously upon two or more rings on to the packings to insure proper joints but in such case no provision was made to insure proper action upon various thicknesses of packing the object being to supersede the use of holes and screws in the rings themselves.

The object of this invention is to construct appliances whereby when two or more glands are used in proximity to one another in a steam engine, such glands can be forced in a line with the valve or piston rod as the case may be by the actuation of one device, and so insure a proper action on all the packings whether such packings be of the same thickness or not.

Our invention will be clearly understood from the following description aided by the annexed drawings in which—

Figure 1:
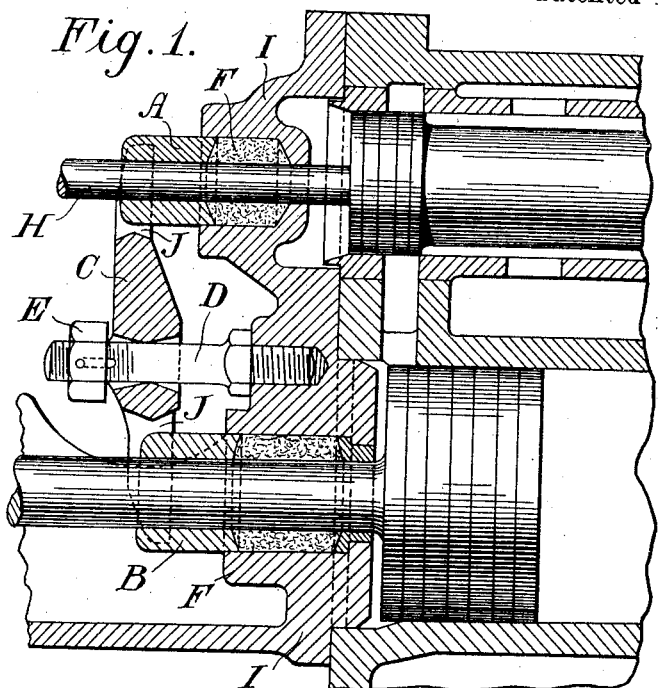
Figure 1 is a sectional elevation of a portion of a cylinder and valve casing and glands and showing our device.
Figure 2:
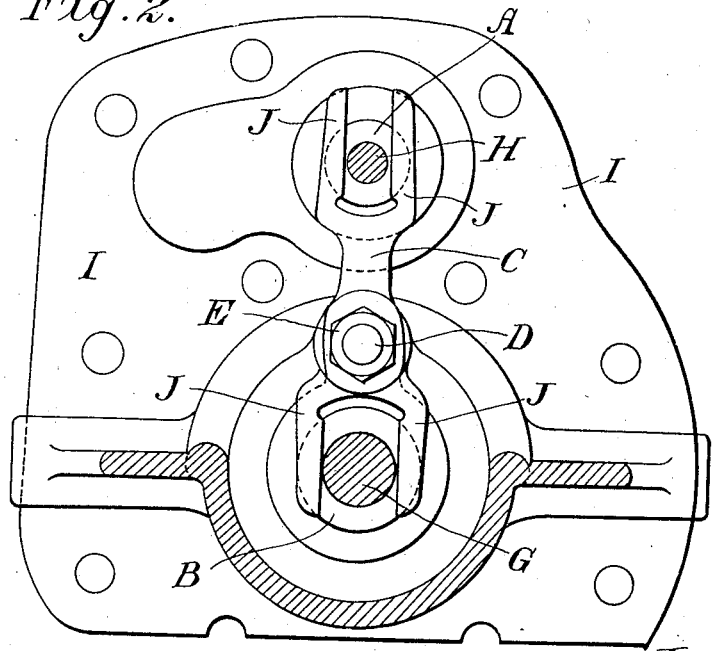
Fig. 2 is an end elevation of the cylinder and valve casing, partly in section.

According to this invention where two, or more packing glands A, B are used we employ a dog or bar C having an aperture formed therein through which a screw threaded stud D is passed. The screw threaded stud is fixed to the cylinder cover I or some other part of engine. As shown the aperture in the dog or bar C flares outwardly toward each face and converges toward the center, whereby the bar may have a limited rocking movement on the stud D.

The dog C preferably has forked ends J, J for encompassing or engaging squared ends of the glands A, B and thereby acts upon the glands and accommodates itself to the position of the same. A screw nut E engages the upper threaded end of the stud D and is adapted to contact with the upper surface of the dog C so as to tend to move the latter downwardly and thus act upon all the glands A, B so as to compress the corresponding packing F associated with each gland. The glands A, B, act upon the packing F in a proper manner irrespective of the relative positions of the glands, as the latter are always forced down by the arms of the dog in a direction parallel with the piston rod G, valve rod H or other rod with which the packing gland may be used.

Where three glands are employed they would preferably be arranged somewhat triangularly with the fixed rod G between them and the dog C would be constructed with an arm for each gland.

What we do claim as our invention and desire to secure by Letters Patent is:—

1. In a steam engine, the combination of a screw threaded stud fixed to the engine casing, a dog mounted on said stud and capable of rocking movement about the same, piston and valve rods extending through the engine casing, packing and packing glands for said rods respectively, said dog having a plurality of arms for engaging said glands and a nut on the threaded portion of said stud adapted to engage said dog whereby the glands may be pressed on their packing by said arms, in a proper manner irrespective of the relative positions of the glands.

2. In a steam engine, the combination of a stud fixed to the engine casing, a dog having an aperture for engaging said stud and provided with a flaring opening at each end permitting a rocking movement of said dog, piston and valve rods projecting through the engine casing, packing and packing glands for said rods respectively, said dog having a plurality of arms for engaging said glands and means engaging said stud adapted to exert pressure on said dog whereby the glands compress the corresponding packings simultaneously and in line with the piston or valve rod, irrespective of the relative positions of the glands.

3. In a steam engine, the combination of a fixed stud, a plurality of packing glands for simultaneously exerting pressure on the corresponding packings and means having compensating action on said fixed stud for simultaneously exerting pressure in the proper direction on said glands irrespective of the relative positions of the glands.

In testimony whereof we have hereunto set our hands in presence of two subscribing witnesses.

WILLIAM THOMAS BELL.
FRANCIS JAMES BRETHERTON.

Witnesses:
FREDERICK GARLON,
ERNEST OCTAVIUS GEORGE.